United States Patent Office 3,435,043
Patented Mar. 25, 1969

3,435,043
PF₅ ADDUCTS OF CERTAIN SUBSTITUTED ACETAMIDES
Mervin E. Brokke, Richmond, Calif., and George E. Lukes, deceased, late of El Cerrito, Calif., by John Hazzard, administrator, Kentfield, Calif., and Duane R. Arneklev, Sunnyvale, Calif., assignors to Stauffer Chemical Company, New York, N.Y., a corporation of Delaware
No Drawing. Filed Apr. 20, 1965, Ser. No. 450,262
Int. Cl. C07f 9/02; C07d 29/20; C07c 103/30
U.S. Cl. 260—294.7                                  6 Claims

ABSTRACT OF THE DISCLOSURE

Compounds which are adduct complexes of phosphorus pentafluoride and certain substituted acetamides corresponding to the formula

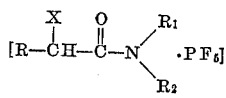

in which R is hydrogen, halogen, naphthyl, or naphthoxy, $R_1$ and $R_2$ are individually hydrogen, lower alkyl, lower alkenyl, or jointly a divalent alkylene having 5 carbon atoms, X is hydrogen or lower alkyl. The above compounds effective herbicides. Rerpresentative compounds are: 2-chloroacetamide-phosphorus pentafluoride complex, 2-chloro-N,N-diethylacetamide - phosphorus pentafluoride complex, 1 - naphthaleneacetamide - phosphorus pentafluoride complex, 2-chloro - N,N-diallylacetamide-phosphorus pentafluoride complex and 2-bromo-N,N-pentamethylene - propionamide - phosphorus pentafluoride-complex.

---

This invention relates to certain new and novel organic compounds which may be used as effective herbicides. More specifically, this invention pertains to complex addition products of phosphorus pentafluoride and certain substituted acetamides as represented by the following formula:

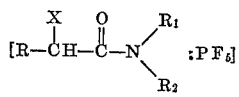

wherein R is selected from the group consisting of hydrogen, halogen, naphthyl and naphthoxy, $R_1$ and $R_2$ are selected from the group consisting individually of hydrogen, lower alkyl, lower alkenyl and jointly of a divalent alkylene having 5 carbon atoms, X is selected from the group consisting of hydrogen and lower alkyl.

It has been found that the new and novel compounds of the present invention are particularly effective as herbicides. They are effective in the control of grasses and broadleaf plants, exhibiting both pre-emergence and post-emergence activity.

The compounds of the present invention can be prepared by various methods. One such method is by contacting the appropriate substituted acetamide under anhydrous conditions with gaseous phosphorus pentafluoride in a cooled normally inert liquid organic solvent, such as benzene, toluene and the like. The products can be obtained in very high yields and technical purity.

Although the exact nature of the phosphorus pentafluoride-amine adducts of the present invention have not as yet been fully determined, the evidence gathered thus far indicates them to be a type of addition product, since their formation is not accompanied by the elimination or formation of any detectable by-products. In lieu of more substantial evidence as to the exact nature of the instant compounds any further discussion along theoretical lines of possible structure will be foregone. It should be pointed out, however, that the formulation of the compounds of the present invention are not promiscous, but instead are dicrete compositions.

The method of preparing typical compounds of the present invention, as well as the manner of using them in herbicidal compositions, are illustrated in the following examples.

EXAMPLE 1

Preparation of 2-(1-naphthoxy)-N,N-diethyl proprion-amide-phosphorus pentafluoride complex.—Under anhydrous conditions, an excess of phosphorus pentafluoride gas was passed into a solution of 13.6 g. (0.05 mole) of 2-(1-naphthoxy)-N,N-diethylpropionamide in 100 ml. of benzene at 25–30° C. with adequate stirring. A grey solid precipitated and was recovered by filtering. After washing with benzene and drying under anhydrous conditions a yield of 19.9 g. or 99% of theory of the title compound was obtained, M.P. 63–65° C.

EXAMPLE 2

Preparation of 2-chloro-N-ethyl-N-butylacetamide-phosphorus pentafluoride complex.—In the same manner as Example 1, an excess of phosphorus pentafluoride gas was passed into a solution of 17.8 g. (0.1 mole) of 2-chloro-N-ethyl-N-butylacetamine in 125 ml. of benzene at 25–30° C. There was obtained 22.3 g. of the title compound, a yellow liquid with a refractive index of $$N_D^{30} = 1.4330.$$

The following is a table of the compounds prepared in accordance with the aforedescribed procedures. Compound numbers have been assigned to each compound and are then used for identification throughout the balance of the application

TABLE I

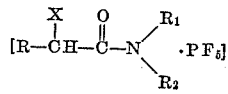

| Compound Number | R | X | $R_1$ | $R_2$ |
|---|---|---|---|---|
| 1 | chloro | H | hydrogen | hydrogen |
| 2 | chloro | H | ethyl | ethyl |
| 3 | hydrogen | H | methyl | methyl |
| 4 | hydrogen | H | hydrogen | ethyl |
| 5 | naphthyl | H | hydrogen | hydrogen |
| 6* | naphthoxy | CH₃ | ethyl | ethyl |
| 7 | chloro | H | n-propyl | n-propyl |
| 8* | chloro | H | ethyl | butyl |
| 9 | chloro | H | allyl | allyl |
| 10 | chloro | H | pentamethylene | |
| 11 | bromo | CH₃ | pentamethylene | |

*No. 6 prepared in Example 1. No. 8 prepared in Example 2.

As previously mentioned, the herein described novel compositions produced in the abovedescribed manner are phytotoxic compounds which are useful and valuable in controlling various plant species. The compounds of this invention were tested as herbicides in the following manner.

Pre-emergence herbicide test.—The seeds of crab grass, foxtail, wild oats, water grass, pigweed, mustard and curly dock were planted in individual rows one-half inch deep in Santa Cruz sandy loam soil contained in compressed paper flats 8¼" x 6½" which are 2¾" deep. Enough seeds were planted to give about thirty to fifty plants each of the plant species in each flat. The flats were watered after planting. The following day each flat was sprayed at the rate of 20 pounds of the candidate compound under test in 80 gallons of solution per acre. An atomizer was used to spray the solution on the soil surface. Two weeks later the degree of weed control was determined by comparing the amount of germination and growth of each weed in the treated flats with weeds in several untreated control flats. The herbicidal activity of the compounds is reported in Table II.

TABLE II.—PRE-EMERGENCE ACTIVITY

| Compound Number | Crab grass | Fox-tail | Water grass | Wild oats | Pig-weed | Mustard | Curly dock |
|---|---|---|---|---|---|---|---|
| 1 | ++ | +++ | +++ | +++ | +++ | + | ++ |
| 2 | +++ | +++ | +++ | +++ | +++ | ++ | - |
| 3 | +++ | +++ | +++ | +++ | +++ | +++ | - |
| 4 | +++ | +++ | +++ | +++ | +++ | +++ | +++ |
| 5 | +++ | +++ | +++ | +++ | - | - | + |
| 6 | +++ | +++ | +++ | +++ | +++ | +++ | +++ |
| 7 | +++ | +++ | +++ | +++ | - | - | - |
| 8 | +++ | +++ | +++ | +++ | ++ | - | - |
| 9 | +++ | +++ | +++ | +++ | +++ | + | +++ |
| 10 | ++ | + | +++ | ++ | - | - | - |
| 11 | | | | | | | |

+++ = Servere injury, death or inhibited germination.
++ = Moderate injury, such as leaf malformation or leaf burn.
+ = Slight injury, such as leaf burn.

Post-emergence herbicide test.—The seeds of five weed species, crab grass, watergrass, wild oats, mustard, curly dock, and one crop, pinto beans (*Phaseolus vulgaris*) were planted in individual rows as described in the pre-emergence test, supra. Two weeks after planting the plant foliage was sprayed with a solution of the test compounds at a rate equivalent to 20.0 lbs./acre. The treated plants were placed back in the greenhouse. Injury ratings were recorded 14 days after treatment. The rating system was the same as that used in the pre-emergence test. Table III lists the results obtained therefrom.

TABLE III.—POST-EMERGENCE ACTIVITY

| Compound Number | Crab grass | Water grass | Wild oats | Mustard | Curly dock | Pinto bean |
|---|---|---|---|---|---|---|
| 1 | +++ | +++ | + | +++ | +++ | +++ |
| 2 | +++ | +++ | +++ | +++ | +++ | +++ |
| 3 | +++ | +++ | ++ | ++ | +++ | +++ |
| 4 | +++ | - | ++ | +++ | +++ | +++ |
| 5 | +++ | +++ | +++ | +++ | +++ | ++ |
| 6 | +++ | +++ | +++ | +++ | +++ | +++ |
| 7 | +++ | +++ | ++ | +++ | +++ | +++ |
| 8 | +++ | ++ | +++ | ++ | +++ | +++ |
| 9 | +++ | ++ | ++ | ++ | +++ | + |
| 10 | +++ | ++ | - | - | +++ | + |
| 11 | ++ | | | | | |

The compounds of the present invention may be used as pre-emergence or post-emergence herbicides and may be applied in a variety of ways at various concentrations. In practice the compounds are usually formulated with an inert herbicidal adjuvant, utilizing methods well-known to those skilled in the art, thereby making them suitable for application as dusts, sprays or drenches. The amount applied will depend upon the nature of the seeds or plants to be controlled and the rate of application may vary from 1 to 80 pounds per acre. One particularly advantageous way of applying the herbicidal composition comprising the adjuvant and an effective amount of a compound of the present invention is as a narrow band along a row crop, straddling the row.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. A compound of the formula

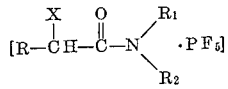

wherein R is selected from the group consisting of hydrogen, halogen, naphthyl and naphthoxy, $R_1$ and $R_2$ individually are selected from the group consisting of hydrogen, lower alkyl, and lower alkenyl and jointly are pentamethylene and X is selected from the group consisting of hydrogen and lower alkyl.

2. The compound, 2-chloroacetamide-phosphorus pentafluoride complex.

3. The compound, 2 - chloro - N,N - diethylacetamide-phosphorus pentafluoride complex.

4. The compound, 1-naphthaleneacetamide-phosphorus pentafluoride complex.

5. The compound, 2 - chloro - N,N - diallylacetamide-phosphorus pentafluoride complex.

6. The compound, 2-bromo-N,N-pentamethylenepropionamide-phosphorus pentafluoride complex.

References Cited

UNITED STATES PATENTS 3,187,043   6/1965   Speziale et al.
3,189,428   6/1965   Mussell _____ 71—128
3,244,747   4/1966   Ratts _____ 260—561 X HENRY R. JILES, *Primary Examiner.*

R. T. BOND, *Assistant Examiner.*

U.S. Cl. X.R.

260—558, 559, 561; 71—82, 86, 128